(12) United States Patent
Berkemeier et al.

(10) Patent No.: US 9,915,219 B2
(45) Date of Patent: Mar. 13, 2018

(54) METHOD AND SYSTEM FOR FUEL INJECTION

(71) Applicant: Ford Global Technologies, LLC, Dearborn, MI (US)

(72) Inventors: Oliver Berkemeier, Bergisch Gladbach (DE); Helmut Hans Ruhland, Eschweiler (DE); Robin Ivo Lawther, Chelmsford (GB)

(73) Assignee: Ford Global Technologies, LLC, Dearborn, MI (US)

(\*) Notice: Subject to any disclaimer, the term of this patent is extended or adjusted under 35 U.S.C. 154(b) by 48 days.

(21) Appl. No.: 14/991,801

(22) Filed: Jan. 8, 2016

(65) Prior Publication Data

US 2016/0201593 A1    Jul. 14, 2016

(30) Foreign Application Priority Data

Jan. 14, 2015   (DE) .......................... 10 2015 200 455

(51) Int. Cl.

| F02D 41/30 | (2006.01) |
|---|---|
| F02M 51/06 | (2006.01) |
| F02M 61/04 | (2006.01) |
| F02M 61/14 | (2006.01) |
| F02M 61/16 | (2006.01) |
| F02D 41/40 | (2006.01) |

(Continued)

(52) U.S. Cl.
CPC ....... *F02D 41/3094* (2013.01); *F02D 41/401* (2013.01); *F02M 35/10177* (2013.01); *F02M 51/06* (2013.01); *F02M 61/04* (2013.01); *F02M 61/14* (2013.01); *F02M 61/16* (2013.01); *F02M 69/045* (2013.01); *F02M 69/046* (2013.01); *F01L 2820/045* (2013.01); *Y02T 10/44* (2013.01)

(58) Field of Classification Search
CPC .............. F02D 41/3094; F02D 41/401; F02M 35/10177; F02M 51/06; F02M 61/04; F02M 61/14; F02M 61/16; F02M 69/045; F02M 69/046; F01L 2820/045; Y02T 10/44
USPC ....................................................... 123/299
See application file for complete search history.

(56) References Cited

U.S. PATENT DOCUMENTS 5,027,778 A * 7/1991 Nogi ....................... F02D 43/00
                                                                       123/472
5,915,353 A    6/1999 Matsumura
(Continued)

FOREIGN PATENT DOCUMENTS

DE    102009044160 A1    4/2010
DE    102008044242 A1    6/2010
(Continued)

*Primary Examiner* — Joseph Dallo
*Assistant Examiner* — Yi-Kai Wang
(74) *Attorney, Agent, or Firm* — Julia Voutyras; McCoy Russell LLP (57) ABSTRACT

Methods and systems are provided for injecting fuel into a combustion chamber of an engine. In one example, a system may include a hollow cone-shaped injector and a control unit to control the injector. The control unit may detect the position of an inlet valve and trigger the injection process, wherein the injector may be configured to spray fuel out of an inlet duct, through an annular gap, and into the combustion chamber of an engine in an injection process.

12 Claims, 7 Drawing Sheets

(51) Int. Cl.
  *F02M 69/04*    (2006.01)
  *F02M 35/10*    (2006.01)

(56) References Cited

U.S. PATENT DOCUMENTS

| | | | |
|---|---|---|---|
| 6,032,652 A * | 3/2000 | Nozawa | F02D 41/0002 |
| | | | 123/478 |
| 6,062,201 A * | 5/2000 | Nozawa | F02D 13/0219 |
| | | | 123/478 |
| 6,725,828 B1 | 4/2004 | Han et al. | |
| 2006/0047406 A1* | 3/2006 | Chatfield | F02D 11/105 |
| | | | 701/104 |
| 2006/0225703 A1 | 10/2006 | Saito et al. | |
| 2009/0241905 A1* | 10/2009 | Tomiita | F02M 35/10177 |
| | | | 123/470 |
| 2010/0236518 A1 | 9/2010 | Bidner et al. | |
| 2011/0144891 A1* | 6/2011 | Nakamura | F02D 41/065 |
| | | | 701/104 |
| 2011/0283974 A1 | 11/2011 | Baeuerle et al. | |
| 2014/0007843 A1* | 1/2014 | Kaneko | F02D 41/3094 |
| | | | 123/445 |
| 2014/0123932 A1* | 5/2014 | Lee | F02B 17/005 |
| | | | 123/294 |
| 2014/0182555 A1* | 7/2014 | Lim | F02M 61/145 |
| | | | 123/470 |
| 2014/0216015 A1* | 8/2014 | Itoh | F01N 3/2066 |
| | | | 60/286 |
| 2014/0261302 A1* | 9/2014 | Nakano | F02D 41/3094 |
| | | | 123/295 |
| 2015/0308362 A1* | 10/2015 | Dunn | F02D 41/3094 |
| | | | 123/300 |

FOREIGN PATENT DOCUMENTS

| | | |
|---|---|---|
| DE | 102008044244 A1 | 6/2010 |
| DE | 102010036574 A1 | 1/2012 |
| DE | 102013222498 A1 | 5/2015 |
| EP | 1927738 A2 | 11/2007 |
| GB | 2073320 A | 10/1981 |
| JP | H11141338 A | 5/1999 |

* cited by examiner

METHOD AND SYSTEM FOR FUEL INJECTION

CROSS REFERENCE TO RELATED APPLICATION

The present application claims priority to German Patent Application No. 102015200455.4, filed Jan. 14, 2015, the entire contents of which are hereby incorporated by reference for all purposes.

FIELD

The present description relates generally to methods and systems for injecting a fuel into an internal combustion engine.

BACKGROUND/SUMMARY

The present subject matter relates to an engine having a combustion chamber, an inlet duct, which may be associated with the combustion chamber, which may be used to supply the combustion chamber with intake air, an inlet valve, which may be designed to close the inlet duct with respect to the combustion chamber in a first position and may be further configured to open wide an annular gap in a second position. The subject engine may further comprise an injector associated with the combustion chamber, for injecting fuel into a motor vehicle having said engine. The present subject matter may further relate to an injection method provided for the engine system described above.

Engines, or more specifically, internal combustion engines, that comprise an injection device arranged within an intake duct are known, one example approach is shown by Baeuerle et al. in DE 102008044244 A1. Therein, Baeuerle discloses an internal combustion engine comprising at least one combustion chamber that may be closed off by an inlet valve and at least one air intake duct leading to said inlet valve. The above mentioned prior art further comprises a fuel injection device, which includes a first and a second injection valve associated with the at least one combustion chamber for the metered injection of fuel into the at least one intake duct. In order to achieve a mixture preparation and ultimately combustion of the fuel/air mixture within the combustion chamber provided, the two injection valves are designed in such a way that the first injection valve discharges a widely spread cone-shaped spray pattern having a substantially large cone angle, and the provided second injection valve discharges a cone-shaped spray pattern that comprises a more acute cone angle relative to that of the first provided injection valve.

However, the inventors herein have recognized potential issues with such systems. As one example, fuel injectors may produce a spray pattern shaped like a solid cone. In producing a solid cone-shaped spray, the usefulness of the spray injectors may not be fully utilized. Specifically, when the fine liquid spray produced by the fuel injector comes into contact with a surface other than the intended target of the annular gap within the combustion chamber, such as the piston or the inlet valve, the previously fine mist may collect and form relatively larger sized droplets. When mixing air and fuel within a combustion chamber, it may be preferable to provide the liquid fuel in a relatively fine particulate form such that it may be easier to completely mix the fuel and the intake air in a more efficient manner.

In one example, the issues described above may be addressed by a method for injecting fuel into a combustion chamber of an engine, comprising; in response to opening an inlet valve associated with the combustion chamber, injecting fuel into the combustion chamber through an injector coupled to an inlet duct, wherein the injected fuel has a geometry of a hollow cone. In this way, a hollow, cone-shaped inlet duct may enable the possibility of using the entire annular gap of a combustion chamber within an internal combustion engine for injection of a fuel. This may result in a larger quantity of fuel being introduced into the combustion chamber.

As one example, an embodiment of the present disclosure may comprise an internal combustion engine having a combustion chamber, an inlet duct associated with a combustion chamber for supplying the combustion chamber with intake air, an inlet valve which may be configured to close an inlet duct with respect to the combustion chamber in a first position and to open wide an annular gap with respect to the combustion chamber in a second position, an injector associated with a combustion chamber for injecting fuel, and a control unit for controlling the injector.

According to the present subject matter, the control unit may be configured to detect a second position of an inlet valve and may be further configured to trigger an injection process of an injector when an inlet valve is in a second position. In a second position, an injector may be arranged within an inlet duct and may be configured to spray the fuel out of an inlet duct and through an annular gap within a combustion chamber during an injection process. In one example, the injector may comprise a hollow cone shape, which may be configured to discharge the fuel in a formation which may comprise the geometry of a hollow cone. In this way, a hollow cone-shaped spray pattern may enable the possibility of using the supplied fuel more effectively, and it may be possible to inject fuel without unnecessary wetting of other surfaces within an inlet duct or inlet valve of a provided internal combustion engine.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 2A-5 are shown approximately to scale although other relative dimensions may be used.

DETAILED DESCRIPTION

The following description relates to systems and methods for injecting fuel into an internal combustion engine. Specifically, this description relates to controlling injectors such as a hollow cone injector 14, illustrated in FIGS. 2A-5. In these figures, the internal combustion engine 11 is provided in various example embodiments. The engine 11 depicted comprises at least one combustion chamber 15, and the combustion chamber may be associated with at least one inlet duct 12, at least one inlet valve 13, and at least one injector 14.

The provided figures serve to illustrate example embodiments of the present disclosure and specifically, a system and method for injecting fuel into a combustion chamber of an internal combustion engine comprises an inlet duct 12 may be configured to carry and supply intake air 17 into the combustion chamber 15 of an engine. The inlet duct 12 may open into the combustion chamber 15 and the inlet valve 13 may be positioned at an inlet area of an inlet duct 12 which may then lead into the combustion chamber 15.

In a first position, the inlet valve 13 may close the inlet duct 12. A fluid flow from the inlet duct 12 and into the combustion chamber 15 may not be possible in this first position. In a second position, the inlet valve 13 may expose the inlet duct 12 via an annular gap 16. The inlet vale is described further below with respect to FIGS. 2A-5. In the second position, a fluid may be able to flow out of the inlet duct 12 and into the combustion chamber 15. Further, in this position, there may exist an opening in the form of an annular gap 16 between an inlet valve 13 and a cylinder head 19 of the engine 11. The provided annular gap 16 may allow for fluid flow within the combustion chamber 15.

In one example embodiment of a system for injecting fuel into an internal combustion engine, the system may comprise a combustion chamber, an inlet duct associated with the combustion chamber which may be used for supplying the combustion chamber with intake air, an inlet valve which may be configured to close the inlet duct with respect to the combustion chamber in a first position, and may also be configured to open wide an annular gap within the combustion engine in a second position. The system may further comprise an injector associated with the combustion chamber for injecting fuel, and a control unit configured to control the operation of an injector.

According to one example of the present disclosure, a control unit may be configured to detect a second position of an inlet valve and may further trigger an injection process of the injector when an inlet valve is in a second position. In this second position, the injector may be arranged within an inlet duct and may be configured to spray fuel out of the inlet duct, through an annular gap, and into a combustion chamber during an injection process. In this example embodiment, the injector described, may comprise a hollow cone shape which may be configured to discharge fuel in a formation which may comprise the geometry of a hollow cone similar to that of the injector itself.

In this way, the arrangement according to the description above may make it possible to use the supplied fuel more effectively. In conjunction with a potential increase in air movement, there may be more time in which the fuel can mix with the intake air before the mixture is ignited within the combustion chamber. Moreover, an injection which may not unnecessarily wet other surfaces of the inlet duct, the inlet valve, the combustion chamber, or the piston in an unwanted manner may be provided.

Figure 1:
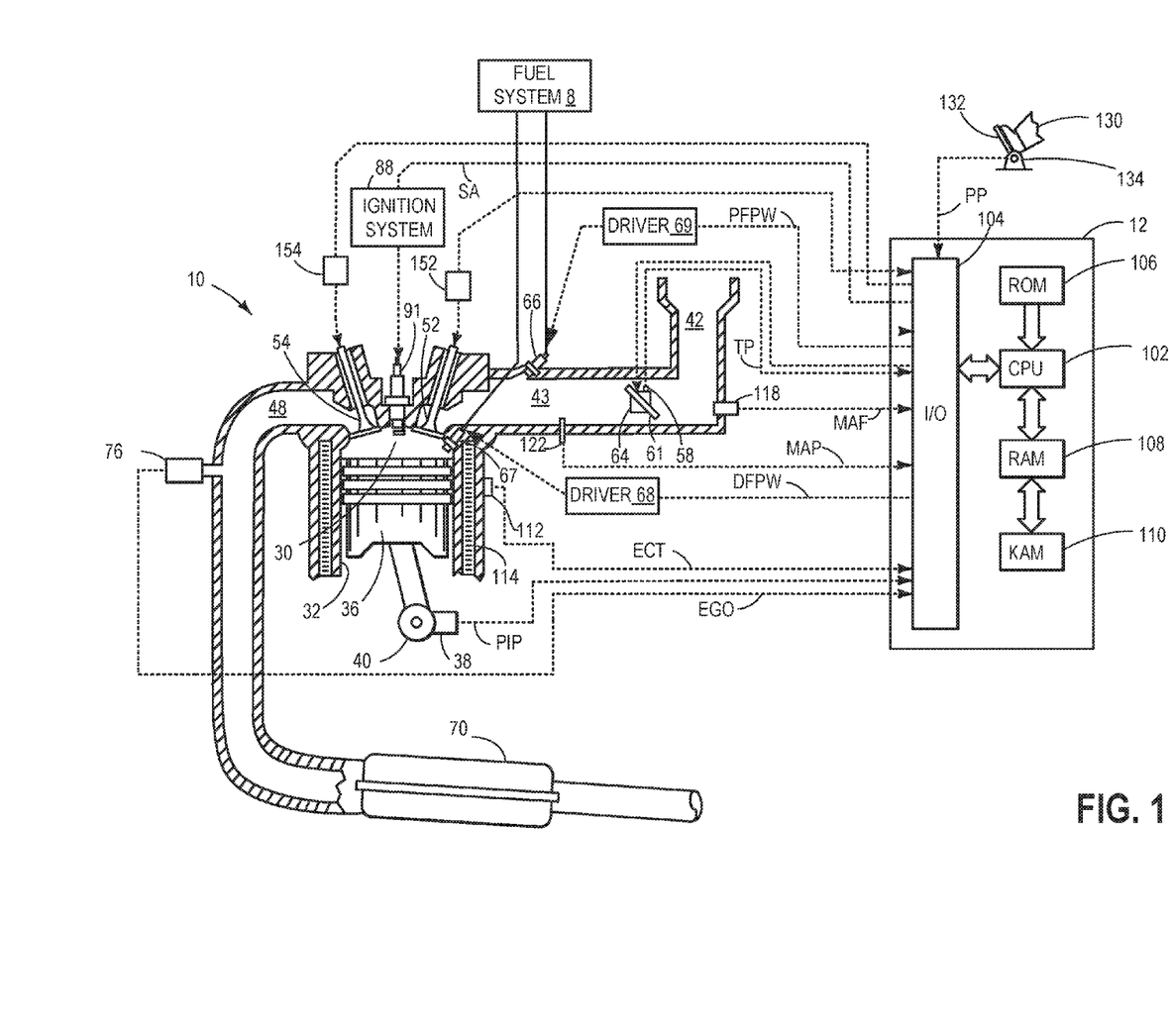
FIG. 1 shows a schematic depiction of an engine.

Turning now to FIG. 1, this figure depicts a detailed embodiment of an internal combustion engine system 10 comprising a combustion chamber 30. Engine system 10 may receive control parameters from a control system which may further include controllers 152, 154 and input from a vehicle operator 130 via an input device 132. In this example, input device 132 may include an accelerator pedal and a pedal position sensor 134 which may be used to generate a proportional pedal position signal PP. A cylinder, which may also be referred to herein as a combustion chamber 30 of engine system 10 may include combustion chamber walls 32 with a piston 36 position therein. That is, a piston 36 may be disposed within the combustion chamber walls 32 in direct face-sharing contact. Further, piston 36 may be coupled to a crankshaft 40 such that reciprocating motion of the provided piston may be translated into rotational motion of the crankshaft 40. Crankshaft 40 may be further coupled to at least one drive wheel of a passenger vehicle via transmission system. Further, a starter motor may be coupled to the crankshaft 40 via a flywheel in order to enable a starting operation of the engine system 10.

Engine system 10 may include a cylinder 30 which may be configured to receive intake air via a series of intake air passages 42, 43. A provided intake air passage 43 may communicate with other cylinders of engine system 10 in addition to cylinder 30. In some embodiments, a throttle 64 which may include a throttle plate 61, may be provided along an intake passage of the engine, and may be used to vary the flow rate and/or pressure of intake air provided to the engine cylinders. For example, the provided throttle 64 may be disposed downstream of intake air passage 42, and upstream of the intake air passage 43.

Exhaust passage 48 may receive exhaust gases from other cylinders within engine system 10 in addition to the illustrated cylinder 30. An exhaust gas sensor, 76 is shown coupled to an exhaust passage 48, upstream of an emissions control device 70. A sensor 76 may be selected from among various suitable sensor for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor for example. Emission control device 70 may comprise a three-way catalyst (TWC), a NOx trap, various other emission control devices, and/or combinations thereof.

Exhaust temperature may be measured by one or more temperature sensors (not shown) located within an exhaust passage 48. Alternatively, exhaust gas temperature may be inferred based on an engine operating condition such as speed, load, air/fuel ratio (AFR), spark retard, etc. Further, exhaust gas temperature may be computed by one or more of exhaust gas sensors 76. It may be appreciated that the exhaust gas temperature may alternatively be estimated by any combination of temperature estimation methods mentioned herein.

Each cylinder of engine system 10 may include one or more intake valves and one or more exhaust valves. For example, cylinder 30 is illustrated as including at least one intake poppet valve 52 and at least one exhaust poppet valve 54 which may be disposed within an upper region of the cylinder 30. In some embodiments, each cylinder 30 of engine system 10 inclusive of the cylinder 30 depicted, may include at least two intake poppet valves and at least two exhaust poppet valves which may be disposed within an upper region of the cylinders 30.

Intake valve 52 may be controlled by a controller 152 by way of cam activation via a cam actuation system (not shown). Similarly, exhaust valve 54 may be controlled by a controller 154 via a cam actuation system. The cam actuation systems described, may include one or more cams and may utilize one or more of cam profile switching (CPS), variable cam timing (VCT), variable valve timing (VVT)

and/or variable valve lift (VVL) systems that may be operated by controllers 152, 154 in order to vary the valve operation. The operation of intake valve 52 and exhaust valve 54 may be determined by valve position sensors (not shown) and/or camshaft position sensors (not shown). In alternative example embodiments, the intake and/or exhaust valve may be controlled by electric valve actuation. For example, cylinder 30 may alternatively include an intake valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system or any combination thereof.

Cylinder 30 may comprise a compression ratio, which may be the ratio of volumes when piston 36 is at a bottom center to top center. Conventionally, the compression ratio may fall within the range of between 9:1 and 10:1. However, in some example embodiments, where different fuels may be used, the compression ratio may be increased. This may occur, for example, when higher octane fuels or fuels with higher latent enthalpy of vaporization are used. The compression ratio may also be increased if direct injection methods are used due to the effect on engine knock specifically.

In some embodiments, each cylinder 30 of engine system 10 may include a spark plug 91 that may be used to initiate combustion within the cylinder. Ignition system 88 may proved an ignition spark to the combustion chamber 30 via a spark plug 91 in response to a spark advance signal SA under select operating conditions. However, in some embodiments, a spark plug 91 may be omitted such as where engine system 10 may initiate combustion via an auto-ignition method, or by the injection of fuel as may be the case with some diesel engines for example.

Some example embodiments of engine system 10 may be configured with one or more injectors for providing a knock control fluid thereto. In some embodiments, the knock control fluid may b a fuel, wherein the injector may also be referred to as a fuel injector. As a non-limiting example, cylinder 30 is shown including one fuel injector 66. Fuel injector 66 is depicted as being coupled directly to cylinder 30 for injecting fuel directly therein in proportion to the pulse width of signal DFPW via an electronic driver 68. In this manner, fuel injector 66 may provide what is known as direct injection (also referred to herein as "DI") of fuel into combustion cylinder 30. While FIG. 1 shows injector 66 as a side injector, it may also be located overhead of the piston 36, such as near the position of spark plug 91. Such a position may improve fuel/air mixing and therefore may improve combustion efficiency when operating the engine with an alcohol based fuel due to the lower volatility of some alcohol based fuels. Alternatively, the injector may be located overhead and near the intake valve to improve mixing. Fuel may be delivered to fuel injector 66 from a high pressure fuel system 8 including one or more fuel tanks, fuel pumps, and a fuel rail. Alternatively, fuel may be delivered by a single stage fuel pump at a lower pressure, in which case, the timing of the direct fuel injection may be more limited during the compression stroke than if a high pressure fuel system is used. Further, while not shown, fuel tanks may comprise a pressure transducer providing a signal to the provided controllers 52, 54. It will be appreciated that, in an alternate example embodiment, injector 66 may be a port injector providing fuel into the intake port upstream of cylinder 30.

Fuel may be delivered by the injector to the cylinder during a single cycle of the cylinder. Further, the distribution and/or relative amount of fuel delivered from the injector may vary depending on engine operating conditions, such as air-charge temperature, as described herein below. Furthermore, for a single combustion event, multiple injections of the delivered fuel may be performed per cycle. The multiple injections may be performed during the compression stroke, intake stroke, and/or any appropriate combination thereof.

As described above, FIG. 1 may only show one cylinder of a multi-cylinder engine. As such, each cylinder may similarly include its own set of intake/exhaust valves, fuel injector(s), spark plugs, etc.

The fuel tanks of fuel system 8 may contain fuel or knock control fluids with different qualities such as different compositions. These differences may include different alcohol content, different water content, different octant content, different heat of vaporizations, different fuel blends, different flammability limits, and/or any combinations thereof. In one example, knock control fluids comprising different alcohol contents may include one fuel being gasoline and the other being ethanol. Other alcohol containing fuels could be a mixture of alcohol and water etc.

Moreover, fuel characteristics of the fuel or knock control fluid stored in the fuel tank(s) of provided fuel system 8 may vary frequently. The day to day variations in tank refilling may thus result in frequently varying fuel compositions, thereby affecting the fuel composition delivered by injector 66.

The provided engine system 10, may further include one or more exhaust gas recirculation passages for diverting at least a portion of exhaust gas from the engine exhaust to the engine intake. FIG. 1 shows a low pressure EGR (LP-EGR) system, but an alternative embodiment may include only a high pressure EGR (HP-EGR) system, or a combination of both LP-EGR and HP-EGR systems. Under some operating conditions, the EGR system may be used to regulate the temperature of the air and fuel mixture within combustion chamber 30. Thus, it may be desirable to measure or estimate the EGR mass flow. For example, one or more sensors may be positioned to provide an indication of one or more of a pressure, temperature, and air-fuel ratio or exhaust gas recirculated through the EGR passage.

The controllers 152, 154 as shown in FIG. 1 may comprise a microcomputer, including a microprocessor unit 102, input an output ports 104, an electronic storage medium for executable programs and calibration values shown as a read only memory chip 106 in this particular example, random access memory 108, keep alive memory 110, and a data bus. Controllers 152, 154 may receive various signals from sensors coupled to engine system 10, in addition to those signals previously discussed, including measurement of inducted mass air flow (MAF) from a mass air flow sensor within an intake air passage 42; engine coolant temperature (ECT) from a temperature sensor 112 which may be coupled to cooling sleeve 114; a profile ignition pickup signal (PIP) from Hall effect sensor 38 (or other type) coupled to a crankshaft 40; throttle position (TP) from a throttle position sensor; and manifold absolute pressure signal (MAP) from sensor 122. Engine speed signal, RPM, may be generated by a controller based on signal PIP. Manifold pressure signal MAP from a manifold pressure sensor may be used to provide an indication of vacuum, or pressure within the intake manifold. Still, other sensors may include fuel level sensors and fuel composition sensors coupled to the fuel tank(s) of the fuel system 8. In response to the signals received from the various sensors, the controller may operate various engine actuators. Example actuators may include fuel injector 66, throttle 64, etc. Storage medium read-only memory 106 may be programmed with computer readable data representing instructions executable by processor 102 for performing the methods described below as well as other variants that may be anticipated but may not be specifically listed. Example routines that may be performed are elaborated upon with reference to FIG. 6.

Figure 2A:
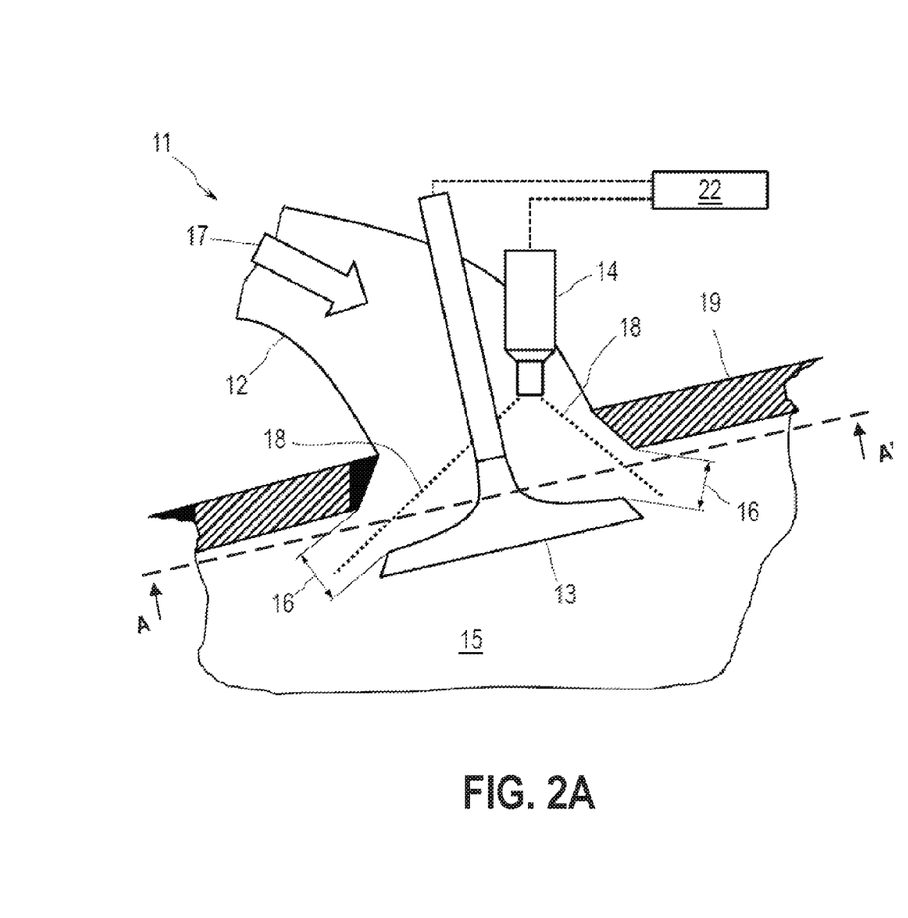
FIG. 2A shows an internal combustion engine according to the present disclosure in a first embodiment.

Next, FIG. 2A shows an engine system 11 having at least one combustion chamber 15. The combustion chamber 15 may be associated with at least one inlet duct 12, one inlet valve 13, and one injector 14. Further, the combustion chamber may be positioned below a cylinder head, the walls of which may be in direct face-sharing contact with the walls of the combustion chamber. The provided inlet duct, 12 may be configured to carry an intake air flow 17 into the combustion chamber 15, and may fully traverse the cylinder head 19, which may define the upper extent of the combustion chamber 15. The inlet duct 12, may comprise a curved shape wherein the uppermost extent of the duct may be longer than a lower extent as shown in the figure.

The inlet duct of the present embodiment may also be configured to open into the combustion chamber 15, via actuation of the inlet valve 13 by a control unit 22. The control unit 22 may be coupled to the injector as well as the inlet valve 13 such that fuel 18 may be supplied in an efficient manner. Similarly, the inlet valve of the present example embodiment may be positioned within an inlet area of a provided inlet duct 12 and ultimately into the combustion chamber 15. The fuel may further flow downward with the assistance of the force of gravity and other forces within the provided engine system 11 and into the combustion chamber 15.

It will be appreciated that the combustion chamber 15 may be defined by the combustion chamber walls 32 as illustrated in FIG. 1, the piston 36 as shown in FIG. 1, and the cylinder head 19 as depicted in FIG. 2A. The piston 36 of FIG. 1 may define the lower extent of the combustion chamber, and the cylinder head may therefore define the uppermost extent of the combustion chamber wherein the overall volume of the chamber is variable responsive to the movement of the piston within the chamber.

Further, the inlet valve 13 and the annular gap 16 may exist in a first and second position, wherein the annular gap is either closed or open respectively. In a first position, the inlet valve 13 may be in direct, face-sharing contact with the cylinder head 19 and an annular gap 16 may be fully closed such that fuel flow from within the provided inlet duct 12 through the annular gap 16 may not be possible. In a second position, the inlet valve 13 may be at a position lower than that of the cylinder head 19, forming an annular gap 16 through which fuel 18 may flow In a first position, the inlet valve 13 may be configured to close an inlet duct 12 by way of closing the annular gap 16. In this first position, a fluid flow originating from the inlet duct and flowing into the combustion chamber 15 may not be possible since the annular gap is no longer open. In a second position, the inlet valve 13 may be actuated by a controller 22 to fully expose the inlet duct 12 via opening the annular gap 16 fully. The inlet valve 13 is shown in FIG. 2-5 in a second position. In this second position, a fluid may flow out of the inlet duct 12 and ultimately into the combustion chamber 15. In a second position, there may exist an opening in the form of an annular gap 16 that may be disposed between an inlet vale 13, and a cylinder head 19 of the engine system 11. In this way, fluid flow may be possible through the described annular gap 16.

An injector 14 may be configured to discharge fuel 18. The injector 14 may further be arranged within an inlet duct 12 in such a way that at least the region of the injector 14 in which the fuel 18 may exit the injector 14 and be projected into the inlet duct 12. The injector may be positioned and aligned in such a way that the fuel 18 discharged by the injector 14 may be sprayed through the annular gap 16 and into the combustion chamber 15. It may be preferable in some embodiments to provide a spray through the annular gap 16 such that the spray may not wet the inlet duct 12 or the inlet valve 13.

In this way, the fuel 18 may pass out of the inlet duct 12, through the annular gap 16, and into the combustion chamber without touching the inlet duct 12 or the inlet valve 13. The injector may further comprise a hollow cone injector 14. In an example embodiment according to the present disclosure, the provided hollow cone injector 14 may be an injector configured to discharge a fuel 18 in a formation comprising the geometry of a hollow cone. During fuel discharge, the inlet valve 13 may be arranged within the hollow void formed by the hollow cone geometry of the fuel injection spray. Specifically, the fuel 18 may be discharged as an annular jet which may widen as it moves away from the injector 14 and may comprise the same or a similar diameter as the annular gap 16 at the position of the annular gap 16 within the combustion chamber 15. In FIGS. 2A-5, the injector 14 and inlet valve 13 are shown in this way.

According to the present disclosure, the engine system 11 may comprise a control unit 22 for controlling the injector 14. The control unit 22 may be configured to initiate a discharge of the fuel 18 by way of the injector 14 while the inlet valve 13 is open. For example, in a second position as defined above, and to prevent discharge of the fuel 18 by way of the injector 14 while the inlet valve 13 may be closed, corresponding to a first position. The control unit 22 may comprise an engine control unit (ECU) or a mechanism coupled to a valve actuator for example.

The controller 22 receives signals from the various sensors of FIG. 1 and employs the various actuators of FIG. 1 to adjust engine operation based on the received signals and instructions stored on a memory of the controller.

For example, adjusting the inlet valve 13 may include adjusting an actuator of the controller unit 22 to adjust the inlet valve 13 such that it may move from a first position into a second position, or from a second position to a first position. As another example, the control unit 22 may further be configured to adjust the injectors 14, 20 which may include adjusting an actuator of the controller unit 22 to adjust the injectors 14, 20 such that they will spray or stop spraying fuel 18 into the inlet duct 12 or through the annular gap 16 and into the combustion chamber 15.

Figure 3:
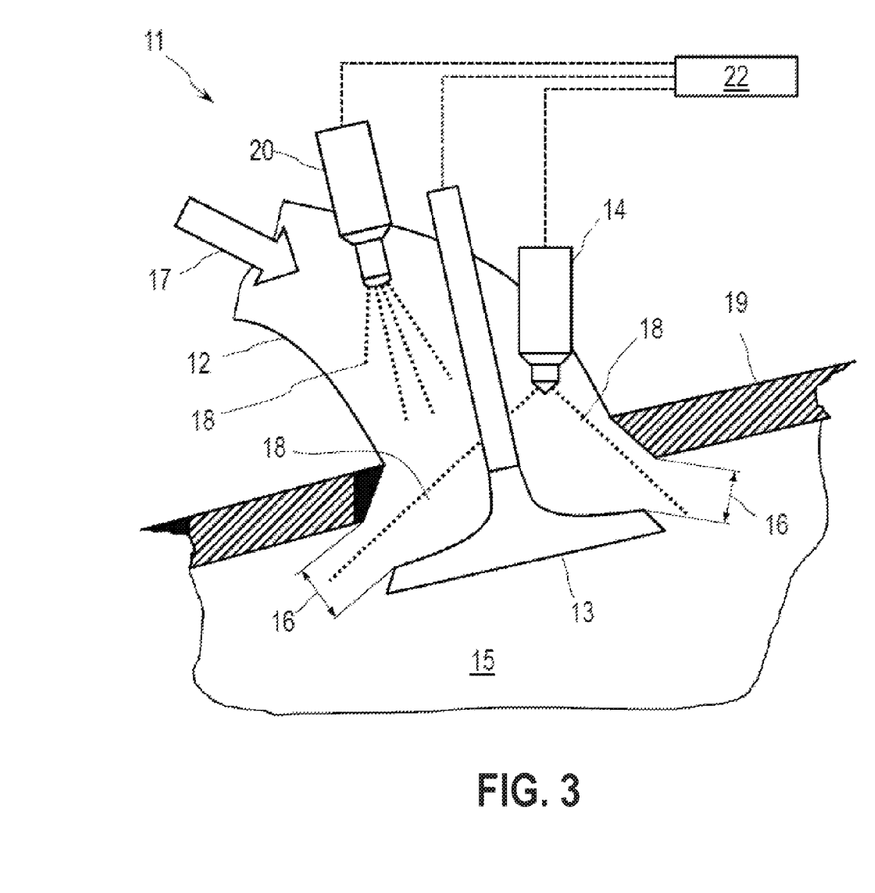
FIG. 3 shows an internal combustion engine according to a second embodiment.
Figure 4:
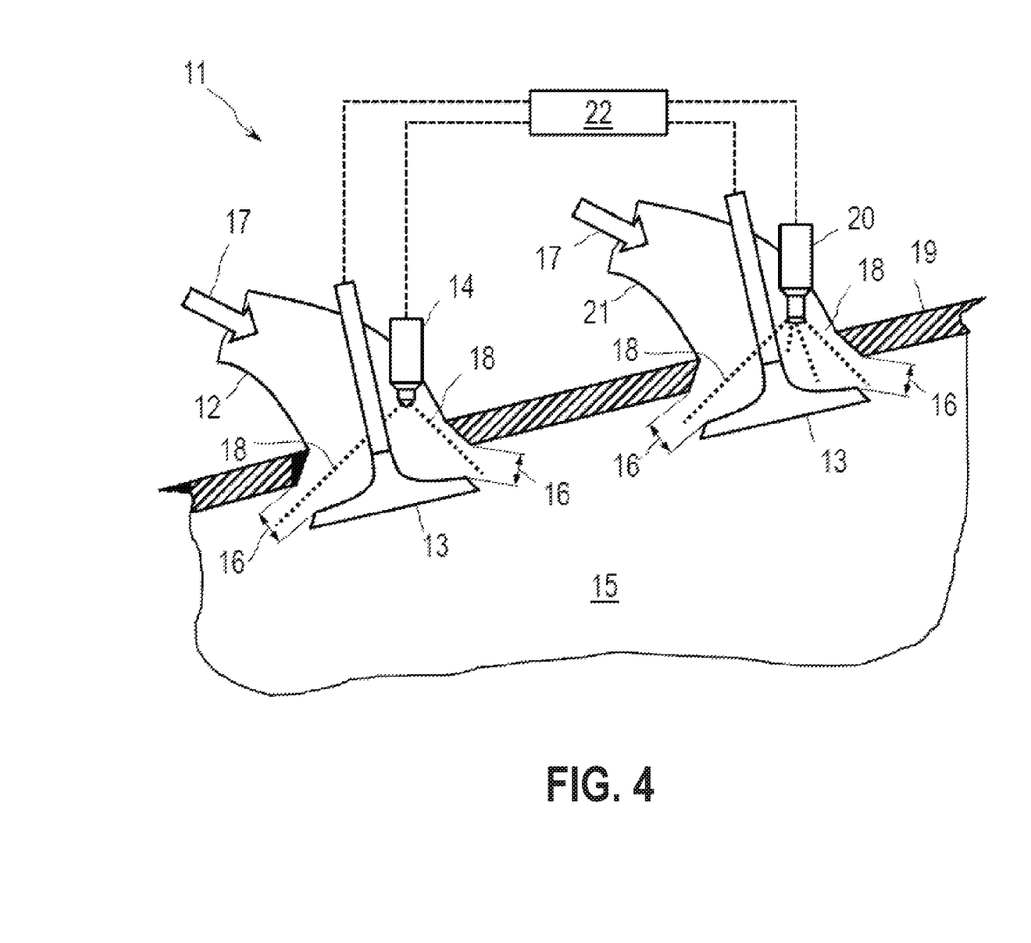
FIG. 4 shows an internal combustion engine according to a third embodiment.
Figure 5:
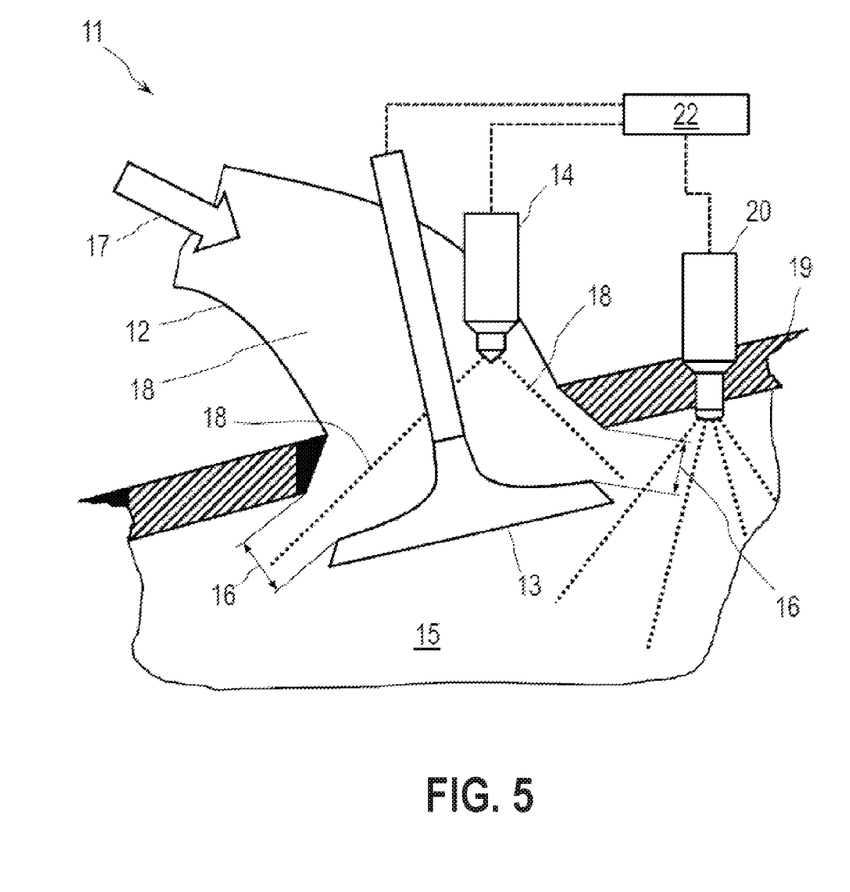
FIG. 5 shows an internal combustion engine according to a fourth embodiment.

In addition to the injector 14, the engine system 11 may comprise a multi-hole injector 20, which may likewise be associated with the combustion chamber 15. The multi-hole injector 20 described herein is illustrated in FIGS. 3-5. Various arrangement of the multi-hole injector 20 may therefore be conceivable. In particular, the multi-hole injector 20 may be arranged and aligned in such a way that as large a proportion as possible of the fuel 18 discharged by the multi-hole injector 20 may also be sprayed through the annular gap 16 and into the combustion chamber 15. Particularly, the multi-hole injector 20 may be configured to introduce additional fuel 18 at engine loads which exceed a predefined value.

Figure 2B:
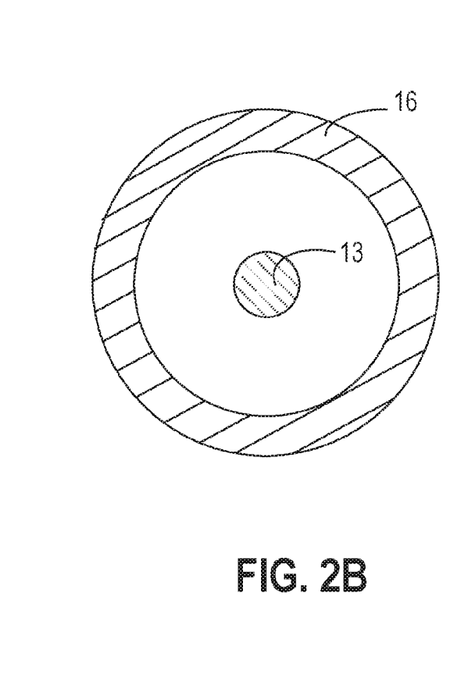
FIG. 2B shows a bottom-up view of an injection device.

FIG. 2B shows a bottom-up view of a provided inlet valve 13 and an annular gap 16 through which fuel 18 may flow on its way into the combustion chamber 15 of one example embodiment of the present disclosure. A second position, where the inlet valve 13 is in an open position is illustrated in this figure. As shown, the annular gap 16 may exist in a state such that the gap takes the shape of a hollow ring. In having the geometry of a hollow ring, the annular gap may be used to its full advantage when an injector of the example engine system 11 may comprise a hollow cone geometry.

In a second position, the annular gap 16 may be substantially circular having a width configured such that a substantial flow of fuel 18 may be supplied to the combustion chamber 15 in an efficient manner. That is, the hollow cone-shaped spray provided by the injector 14 which may comprise a hollow cone geometry, may flow freely through the annular gap 16 in a second position of an example embodiment of the engine system 11 of the present disclosure.

In this way, when the supplied fuel 18 is sprayed by the injector 14 into a combustion chamber 15, the fuel spray 18 may be directed solely into the annular gap 16 such that unnecessary wetting of other surfaces such as the piston and inlet walls etc. does not occur. It will be appreciated that as illustrated in FIG. 2B, the inlet valve 13 is shown in an open position, referred to herein as a second position, but that a first position in which the annular gap 16 is substantially closed may also occur.

In a first position, the inlet valve 13 may rest flush and in direct face-sharing contact with the piston head 19 and the lower extent of the walls of a provided inlet duct 12. In this first position, a flow of fuel 18 may not be possible through the supplied annular gap 16. In a first position, a provided control unit 22 which may be configured to actuate the injector 14, may provide a signal to the injector 14 in which the injector does not provide a fuel 18 flow. In this way, it may be possible to electronically and automatically control the flow of a fuel 18 into the combustion chamber 15 based on a detection by the control unit 22 that may serve as an indication of whether the inlet valve 13 is in a first or second position. Once the position detection has been made, the control unit 22 may actuate the injector 14 accordingly.

Turning now to FIG. 3, this figure shows an example embodiment wherein a multi-hole injector 20 may be arranged in the same inlet duct 12 as the injector 14. In such a case, the multi-hole injector 20 may be positioned upstream of the injector 14. In this example embodiment, the provided multi-hole injector 20 may be present and configured such that fuel 18 may be supplied to and maintained within the inlet duct 12 when the inlet valve 13 may be in a closed, first position.

Although FIG. 3 specifically illustrates a second position of an example embodiment wherein the inlet valve 13 is open and an annular gap 16 is also open, a first position wherein the annular gap 16 is fully closed may also occur. In a case where the inlet valve 13 and the annular gap 16 may be in a closed position, the multi-hole injector 20 may be used to supply fuel to the inlet duct 12 in engine operating conditions that may, for example, exist at high engine loads.

In this embodiment, a multi-hole injector 20 may be provided in addition to a hollow cone injector and may further be disposed within an uppermost exterior wall of an inlet duct 12 and may be coupled to a control unit 22. The provided control unit 22 may also be coupled to the inlet valve 13 and a provided hollow cone shaped injector 14 such that control over each of the individual components may be achieved. In this way, when more fuel may be needed, the sensor 22 may actuate the inlet valve 13 to open and allow fuel 18 flow through the annular gap 16, may actuate the multi-hole injector 20, or may actuate the hollow cone injector 14 or any combination thereof. This may allow for fuel to collect within an inlet duct 12 such that when needed, more fuel 18 may be supplied to the combustion chamber 15 immediately prior to the multi-hole injector 20 and the hollow cone injector 14 providing fuel flow through the annular gap 16 and into the combustion chamber 15.

The controller 22 receives signals from the various sensors of FIG. 1 and employs the various actuators of FIG. 1 to adjust engine operation based on the received signals and instructions stored on a memory of the controller.

For example, adjusting the inlet valve 13 may include adjusting an actuator of the controller unit 22 to adjust the inlet valve 13 such that it may move from a first position into a second position, or from a second position to a first position. As another example, the control unit 22 may further be configured to adjust the injectors 14, 20 which may include adjusting an actuator of the controller unit 22 to adjust the injectors 14, 20 such that they will spray or stop spraying fuel 18 into the inlet duct 12 or through the annular gap 16 and into the combustion chamber 15.

In a further example embodiment provided in FIG. 4, the engine system 11 may comprise at least two inlet ducts 12, 21. A multi-hole injector 20 may be disposed within the uppermost wall of a provided second inlet duct 21. The multi-hole injector 20 may be arranged within a second inlet duct 21, which may likewise be configured to supply an intake airflow 17 as well as the supplied fuel 18 into the combustion chamber 15. The provided multi-hole injector 20 may be further coupled to a control unit 22 such that the control unit may actuate the injector 20 when needed. For example, when more fuel may be required within the combustion chamber 15, the control unit 22 may actuate one or more of a multi-hole injector 20, a hollow cone injector 14, or the inlet valve 13 such that a fuel 18 may be supplied to the combustion chamber 15 of an engine system 11.

Further, as one non-limiting example, a hollow cone injector 14 may be arranged within a first inlet duct 12 and may be disposed within an uppermost wall of the inlet duct 12. The hollow cone injector may be coupled to a control unit 22 which may also be coupled to the inlet valve 13 such that the control unit 22 may actuate the injector 14 and/or inlet valve 13 independently. In this way, it may be possible to supply fuel 18 to the inlet duct 12 responsive to the position of the inlet valve 13. Specifically, when inlet valve 13 is in a second position, a position where an annular gap 16 may be substantially open, the fuel 18 may flow freely from the injector 14 and through the annular gap 16 into the combustion chamber 15.

An additional feature of the embodiment provided in FIG. 4 may be that one or more of the provided injectors 14, 20 may be actuated independently and at different times responsive to engine operating conditions. For example, when more fuel may be needed, the inlet valves 13 of a first inlet duct 12 and a second inlet duct 21 may both be in a first position, meaning that the inlet valves are closed and may not allow fuel flow through the annular gap 16, fuel 18 may still be supplied via a hollow cone injector 14 and/or a multi-hole injector such that fuel may flow easily into the combustion chamber immediately after the inlet valve 13 returns to a second position, and thus, opens the annular gap 16. In this way, a larger amount of fuel may be supplied to the combustion chamber 15 immediately after the inlet valve 13 is opened. Further, once in a second position, the provided injectors 14, 20 may continue to operate as described above and provide a fuel 18 flow through a provided annular gap 16.

A controller unit 22 may be coupled to both an inlet valve 13 and an injector 14, 20 of each provided inlet ducts 12, 21. The control unit 22 may provide actuation of each inlet duct's respective components such that each component may be controlled and actuated independently and automatically. In this way, fuel 18 and air 17 may be provided in an efficient mixture at a plurality of engine operating conditions.

The controller 22 receives signals from the various sensors of FIG. 1 and employs the various actuators of FIG. 1 to adjust engine operation based on the received signals and instructions stored on a memory of the controller.

For example, adjusting the inlet valve 13 may include adjusting an actuator of the controller unit 22 to adjust the inlet valve 13 such that it may move from a first position into a second position, or from a second position to a first position. As another example, the control unit 22 may further be configured to adjust the injectors 14, 20 which may include adjusting an actuator of the controller unit 22 to adjust the injectors 14, 20 such that they will spray or stop spraying fuel 18 into the inlet duct 12 or through the annular gap 16 and into the combustion chamber 15.

Further, as a non-limiting example, when the inlet valve 13 of a first inlet duct 12 is in a first, open position, the inlet valve 13 of a second duct 21 may be in a first, closed position and vice versa. This may further enable fuel 18 flow into the combustion chamber at a plurality of engine operating conditions. For example, when more fuel may be needed, and a first inlet duct 12 and inlet valve 13 are in a closed, first position, and the inlet valve 13 of a second inlet duct 21 is in an open position, having the annular gap 16 wide open, the hollow cone injector 14 of a first inlet duct 12 may be actuated by control unit 22 in order to provide fuel 18 to the inlet duct 12 such that as soon as a second, open position is returned to, the supplied fuel may rush through the annular gap 16 and throughout the duration of the annular gap 16 being in an open second position, the hollow cone injector 14 may continue to supply fuel 18 through said annular gap 16 and into the combustion chamber 15.

In this example, the inlet ducts 12, 21 and their respective components, such as inlet valves 13, annular gaps 16, and injectors 14, 20, may be positioned above and upstream of a provided combustion chamber 15. In this way, the flow of fuel 18 may be more efficient through using primarily gravity in conjunction with other pressure forces within the engine to move a fuel/air mixture from the inlet ducts 12, 21 above and down into the combustion chamber 15 that lies below.

An additional example embodiment, as illustrated in FIG. 5, may include a hollow cone injector disposed within an uppermost wall of an inlet duct 12, and a multi-hole injector 20 that may be arranged for direct injection within the cylinder head 19. In this embodiment, a multi-hole injector 20 may be configured in such a way as to discharge fuel 18 directly into the combustion chamber 15.

As a non-limiting example, the provided hollow cone injector 14 may provide fuel 18 flow into the combustion chamber only when the inlet valve 13 is in a second position. In a second position, the annular gap 16 may be substantially open so as to readily and easily allow fuel 18 flow through the gap and into the combustion chamber 15 below. Since the injector 14 may only supply fuel 18 flow into the combustion chamber in a second position, it may be useful to provide a multi-hole injector 20 that may be disposed within the cylinder head 19 itself. In this way, fuel may flow more readily into a combustion chamber even if the inlet valve 13 is in a first position wherein the annular gap 16 may be fully closed. In a first position, the inlet valve may rest flush against the cylinder head 19 and may be in direct face-sharing contact with said cylinder head 19.

In a second position, the inlet valve 13 may be positioned below the cylinder head 19 of engine system 11 such that an annular gap 16 may be fully opened and may facilitate the flow of fuel 18 through the gap and into the combustion chamber below. In a second position, a provided multi-hole injector disposed within the cylinder head 19 may be used to supply fuel 18 into the combustion chamber directly without having to depend on the position of the inlet valve 13. In this way, an engine 11 operating at a high load condition may be supplied with fuel in a more continuous manner.

Figure 6:
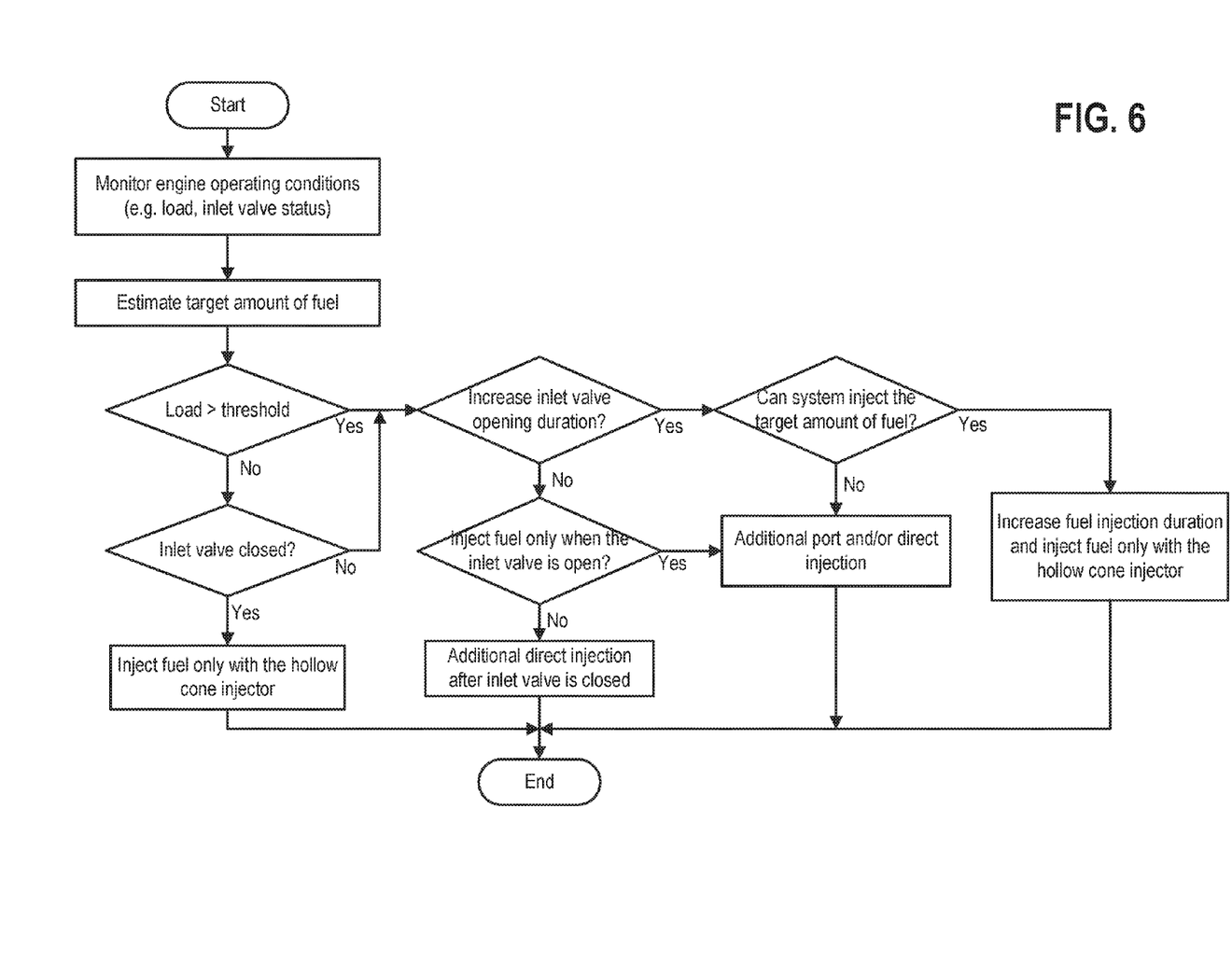
FIG. 6 shows a flowchart illustrating the operation of a fuel injection system according to the present disclosure.

The provided engine system 11 may be configured to carry out an injection method which is further illustrated by FIG. 6 in a flow diagram in an illustrative configuration from a start to an end responsive to and based on a plurality of engine operating conditions.

In an injection method according to the present disclosure, fuel 18 may be injected by means of an injector 14 in an injection process. According to the present disclosure, the injection process may be carried out only when an inlet valve 13 is in an open position. The fuel 18 sprayed out of an inlet duct 12, through an annular gap 16, and ultimately, into the combustion chamber 15. Particularly, the fuel 18 may be injected in a formation which may comprise the same geometry as that of a hollow cone.

In order to determine the position of the provided inlet valve 13, the current position of the inlet valve 13 may be detected by a sensor within the control unit 22. In particular, in a position detection step 35 and then checked in a position check step. If the position check shows that the current position of the inlet valve 13 is the second position, meaning that the inlet valve 13 is in an open position, the injection process may then be performed. If the position check indicates that the current position of the inlet valve 13 is not in a second position, the injection process may not be performed. The position determination may then be performed in a loop until the end result of the position check 36 returns a positive indication.

The injection process of the present disclosure may have a duration which may be shorter than or equal to the opening duration of the provided inlet valve 13, with the result being that the injection process is complete before the inlet valve 13 closes again.

In addition to the injection process, the injection method may further include an additional injection process. In a provided additional injection process, additional fuel 18 may be introduced into the combustion chamber by way of a provided multi-hole injector 20. The additional injection process may be performed within an inlet duct as shown in FIG. 3. As an alternative, the additional injection process may be performed into the second inlet duct 21 as shown in FIG. 4. It may be further possible to perform the additional injection process 34 directly into the combustion chamber 15 as illustrated in FIG. 5. The additional injection process may further be carried out simultaneously with an injection process. It may also be possible for the additional injection process to begin earlier or to end later than the injection process.

In particular, the additional injection process may be carried out in accordance to a current engine load. In particular, the current engine load may be detected in a load detection step and then may be checked in a load check step. If the current engine load exceeds a predefined value, for example, the additional injection process may be carried out.

If the current engine load does not exceed a predefined value, the additional injection process may not be carried out and the fuel 18 may be introduced in an injection process alone by means of the injector 14.

Turning now to FIG. 6 specifically, this figure shows a flow chart illustrating the example operation of the embodiments provided and described herein. Instructions for carrying out the method described above and the rest of the methods included herein may be executed by a controller 22 based on instructions stored on a memory of the controller and in conjunction with signals received from sensors of the engine system, such as the sensors described above with reference to FIG. 1. The controller 22 may employ engine actuators of the engine system to adjust engine operation, according to the methods described below.

Specifically, in a first example method for injecting fuel into a combustion chamber of an engine system, once the engine has been started, the system comprising a plurality of sensors and controllers as described briefly above, may actively monitor the engine operating conditions such as engine load and inlet valve temperature for example. Once the engine operating condition has been identified by the system, the method may further comprise estimating the target amount of fuel based on the identified engine operating condition. From here, if a load is not greater than a predetermined threshold, the system will continue to check whether or not the inlet valve is closed. If the inlet valve is closed (the inlet valve is in a first position) then the system will alert controller 22 via a system of sensors to indicate that fuel may be supplied to the combustion chamber 15 via the hollow cone injector.

If the engine load for example, is greater than a predetermined threshold however, a plurality of steps within the method may be changed. Specifically, if an engine load is greater than a predetermined threshold, and the duration of time an inlet valve is to be opened is not increased, fuel may be supplied either when the inlet valve is open or when the inlet valve is closed. If the system determines that it may be preferable to supply fuel both when the inlet valve is open and when it is closed, an additional direct injection injector may be used to supply fuel into the combustion chamber after the initial inlet valve is closed.

However, if the system determines that the engine may only need fuel when the inlet valve is open, and additional port and or direct injection injector may be actuated via a controller 22 to supply fuel only when the inlet valve is in a second position, meaning that the valve is open and fuel may flow freely through an annular gap 16.

Further, when an increase in the inlet valve duration may be possible or preferable based on the indication of the controller 22 and various sensor of the engine system of FIG. 1. The system may then determine whether or not a single injector is capable of injecting the required amount of fuel. In the case that a single injector may not be capable of providing the necessary amount of fuel for a required engine load, an additional port and/or a direct injection injector may be actuated via controller unit 22.

In a case where the system determines that it may be possible for a single injector to supply the required amount of fuel to the combustion chamber, it may be further necessary to vary the duration that the inlet valve is in a second position, meaning that it may be necessary to keep the annular gap 16 open for a longer period of time. In such a case, the fuel injection duration may be adjusted and the fuel may only be supplied by the hollow cone injector for example.

In varying the duration an injector is operational as well as allowing for other injectors to operate independently, it may be possible to provide fuel flow into a combustion chamber in a more efficient manner. It may further be possible to supply a variable fuel flow into the combustion chamber responsive to a plurality of engine operating conditions.

Figure 7:
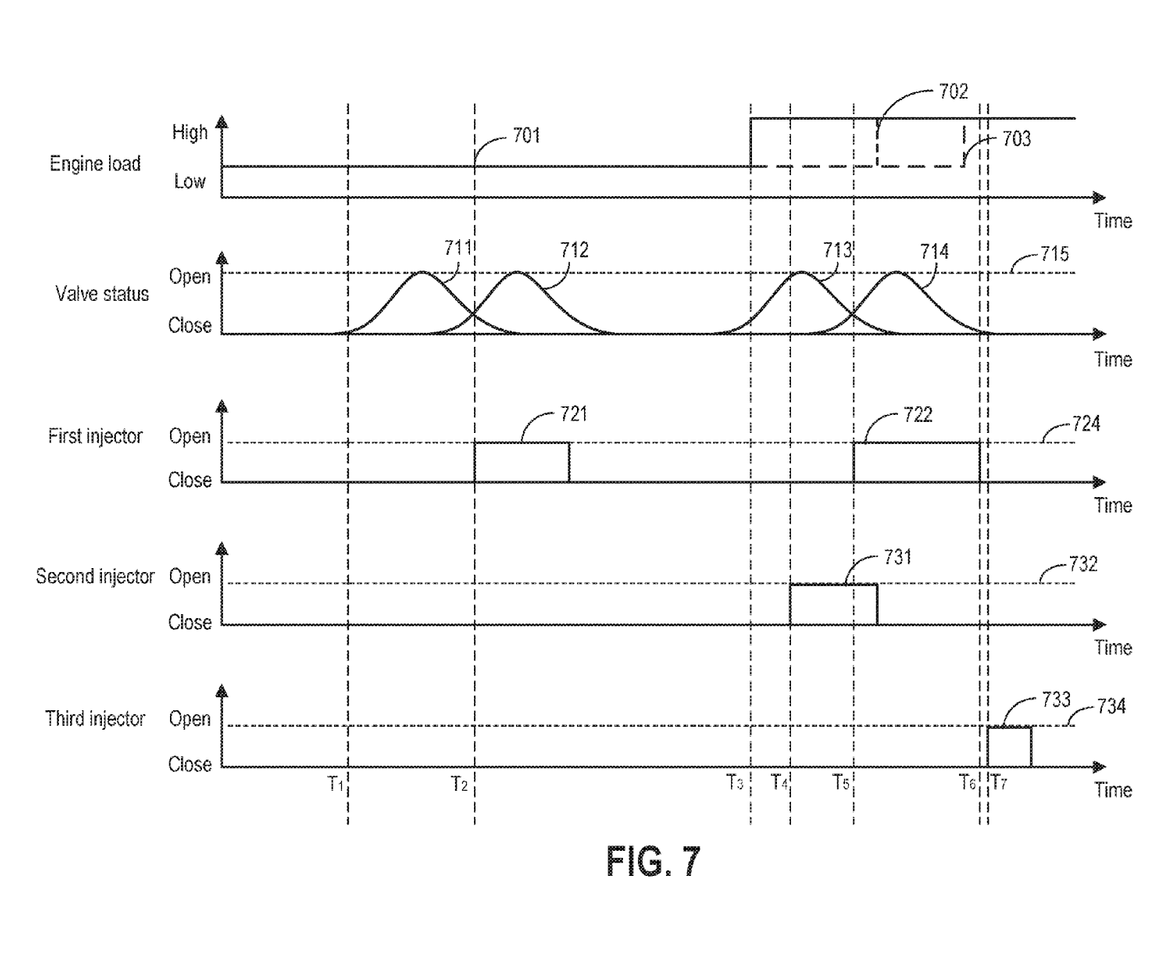
FIG. 7 shows a schematic illustration of the method or operation of a fuel injection system.

Turning now to FIG. 7, this figure schematically illustrates the method as described above with reference to FIG. 6. The figure shows an example engine having a high and low engine load conditions relative to time.

In a first operating condition, at a first time interval $T_1$, the engine may be operating at a "normal" operating condition wherein the engine load is between a low engine load and a high engine load. At this normal operating condition, a valve may open and close normally as illustrated by peak 711. The valve status, meaning whether it is in an open or closed position may be variable with respect to time, that is, the valve may be open or closed for a longer or shorter duration dependent upon engine operating conditions.

As illustrated in FIG. 7, at a time interval between $T_1$ and $T_2$, a first injector, the hollow cone injector, may be closed in a normal operating condition, meaning that the fuel already held within the combustion chamber may be substantial enough to provide for the engine's current operating load. At a time subsequent to $T_2$, the engine may still be operating at a normal engine load, but more fuel may be required by the combustion chamber to continue operation. In this case, the valve may again open and return to a second position as indicated by peak 712 and a first injector may be opened to supply additional fuel into the combustion chamber as shown by block 721. It will be appreciated that the injectors of the present disclosure may operate solely as open or closed, meaning that they will either supply a fuel flow or will not supply a fuel flow responsive to indications received by a control unit 22.

In an example wherein the engine system may be operating at a high engine load condition, such as that of time interval $T_3$, a valve may begin to open responsive to a signal from a control unit and while the valve is opening, a second injector, a port injector for example, may be actuated via a control unit 22 such that the injector may supply fuel into the combustion chamber while in an open position as indicated by block 731. As illustrated by the valve status plot, the valve may move from a first open position indicated by the peak of 713 into a closed first position at a time interval $T_5$. While the valve is moving from a first to a second position however, a second injector, a port injector for example, may still be actively supplying fuel into the inlet duct. In this way more fuel may be made available to the engine system and upon the valve moving back into an open position as indicated by the peak 714, the second port injector may provide flow until the valve is in a second position again wherein a first, hollow cone injector may then be actuated via a control unit to open and supply fuel.

When the high engine load demand is met, the engine load may, in some instances, decrease to a lower engine load or even a normal engine load as illustrated by the dashed lines of the engine load plot of FIG. 7. In such a case, a provided second injector, a port injector for example, may provide fuel until a higher engine load is once again obtained as shown by the inflection point 702 of the engine load plot. At this inflection point 702, the valve may be substantially opened but may be still executing the opening process. That is, the valve may be mostly open, but not fully in a second position as defined above. However, when the valve may finally be opened and in a second position, the first injector, the hollow cone injector may then be actuated such that a fuel flow is supplied to the engine system.

In a further example embodiment, a direct injection injector as described above with reference to FIG. 5, may be provided. In such a case, the direct injection injector may be used to further accommodate high engine loads for example. Specifically, as an engine load may increase to a level deemed "high," the actions described above with reference to a first hollow cone injector and a second multi-hole injector, may be used and may be further combined with a direct injector as illustrated in FIG. 5. Specifically, when an engine condition may be high, but may be higher than may be accounted for via the first and second injectors, a third injector may be used to supply fuel to the combustion chamber when the valve is in a first position and flow through the annular gap may not be possible.

For example, when an engine load is high, as described above, the valve may open as indicated by 713, and responsive to a signal from a control unit, a second injector may be actuated to open and provide fuel flow after the valve has closed and initiates a second opening sequence indicated by peak 714. Once the valve begins a second opening sequence, the second injector may then be actuated via a control unit to open and supply additional fuel into the combustion chamber. However, if the engine load is higher than a threshold that may be mediated by only a first and second injector, a third direct injector may be additionally actuated.

Specifically, in a case where the two injectors may not provide enough fuel to the combustion chamber at the end of time interval $T_6$, when the valve is fully closed and in a first position, at time interval $T_7$, a third direct injector may be actuated at a time interval $T_7$ such that the injector is open as shown by block 733. When the second valve operation denoted by peak 714 results in the closing of the valve, wherein the valve is in a first position, a third direct injector may then be actuated via a control unit.

The feature of an additional direct injector may allow for higher operating loads for example, actively monitoring the system and actuating the injector(s) accordingly based on signals received by the injectors from a control unit. This may further allow for an increased efficiency at a plurality of various and distinct engine operating conditions.

FIGS. 1-5 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example.

An example technical effect of providing a hollow cone-shaped injector is that it may now be possible to utilize the entire annular gap of a combustion chamber for the injection of fuel. As a result, a larger quantity of fuel may then be introduced into the combustion chamber by means of the disclosed injection method.

As one example embodiment, a method for injecting fuel into a combustion chamber of an engine may comprise, in response to opening an inlet valve associated with the combustion chamber, injecting fuel into the combustion chamber through an injector coupled to an inlet duct, wherein the injected fuel may have the geometry of a hollow cone. In a first example of the method, an annular gap may be formed between an opened inlet valve and an outlet of an inlet duct that may be coupled to a combustion chamber. A second example of the method may optionally include the first example and may further comprise an injected fuel entering the combustion chamber through the annular gap without wetting an inlet valve or an inlet duct. A third example of the method may optionally include one or more of the first and second examples, and may further include that additional fuel may be injected into the combustion chamber based on a change of the engine's operating conditions. A fourth example of the method may optionally include one or more of the first through third examples, and may further comprise a system wherein the additional fuel may be injected with the injector by increasing the injection duration time. A fifth example may optionally include one or more of the first through fourth examples and may further include, wherein the additional fuel is injected with an additional injector associated with the combustion chamber when an engine load is greater than a predetermined threshold. A sixth example may optionally include one or more of the first through fifth examples and may further comprise, wherein the additional injector may be selected in response to an increase in an engine load and the status of an inlet valve. Additionally, a seventh example may optionally include one or more of the first through sixth examples and may further include, wherein the additional injector may be an injector coupled to an inlet duct upstream of a first injector. In an eighth example, the method may optionally include one or more of the first through seventh examples and may further comprise, wherein the additional injector may be an injector coupled to a second inlet duct associated with the combustion chamber. In any of the above example embodiments, the system may further include, wherein the additional injector is an injector coupled to the combustion chamber.

An engine system of the current disclosure may comprise a combustion chamber, an inlet duct associated with the combustion chamber, an inlet valve, a hollow cone injector coupled to the inlet duct upstream of the inlet valve; and a controller configured with computer readable instructions stored on non-transitory memory for actuating the inlet valve, monitoring an engine load, injecting a first amount of fuel via the hollow cone injector, and in response to the target amount of fuel greater than a threshold, injecting a second amount of fuel.

Another example embodiment of an engine system according to the present disclosure may comprise a combustion chamber, an inlet duct associated with the combustion chamber, an inlet valve, a first injector coupled to the inlet duct upstream of the inlet valve, wherein fuel discharged from the injector may comprise a hollow cone geometry, a second injector, and a controller configured with computer readable instructions stored on non-transitory memory for monitoring an engine load, determining an amount of fuel to be injected for each injector in response to a change in the engine load, and injecting fuel with the first and second injectors based on the determined amount of fuel within the engine system.

In another representation, control of a first hollow cone port injector and a second direct injector in the same cylinder may take advantage of charge cooling by adjusting fuel injection and valve timing responsive to engine load, including an increase in engine load greater than a threshold. For example, responsive to the increase and when charge cooling from the hollow cone injection alone is insufficient to abate knock, the hollow cone injection may be increased to a maximum amount but an amount where the injection ends at or before closing of the intake valve. The direct injection amount may be increased and be during or extend into the compression stroke after closure of the inlet valve(s). However, if conditions are such that sufficient charge cooling is already available with only the port hollow cone injector even with the increase in engine load, the port injection may be started earlier than inlet valve opening without adjustment of the direct injection amount.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for injecting fuel into a combustion chamber of an engine via first and second injectors, comprising:
when engine load is not greater than a threshold, injecting an annular jet of fuel having a geometry of a hollow cone through a first injector coupled to an inlet duct in response to opening an inlet valve associated with the combustion chamber, and not injecting fuel through a second injector coupled to the inlet duct upstream of the first injector; and
when engine load is greater than the threshold, initiating injection of fuel through the second injector prior to opening the inlet valve, and then injecting an annular jet of fuel having a geometry of a hollow cone through the first injector in response to opening the inlet valve, while continuing to inject fuel through the second injector.

2. The method of claim 1, wherein an annular gap is formed between the opened inlet valve and an outlet of the inlet duct coupled to the combustion chamber.

3. The method of claim 2, wherein the injected fuel enters the combustion chamber through the annular gap without wetting the inlet valve or the inlet duct.

4. The method of claim 1, further comprising increasing an injection duration of the first injector when engine load exceeds the threshold.

5. The method of claim 1, further comprising, when engine load is greater than the threshold, injecting additional fuel with a third injector, wherein the third injector is a direct injector coupled to the combustion chamber.

6. An engine system comprising:
a combustion chamber;
an inlet duct associated with the combustion chamber;
an inlet valve;
a hollow cone injector coupled to the inlet duct upstream of the inlet valve;
a port injector coupled to the inlet duct upstream of the hollow cone injector; and
a controller configured with computer readable instructions stored on non-transitory memory for:
adjusting timing of actuating the inlet valve;
monitoring an engine load;
estimating a target amount of fuel based on the engine load;
injecting a first amount of fuel via the hollow cone injector only while the inlet valve is open, the first amount of fuel discharged from the hollow cone injector as an annular jet having a geometry of a hollow cone; and
in response to the target amount of fuel being greater than a threshold,
injecting a second amount of fuel via the hollow cone injector and the port injector, including initiating injection of fuel via the port injector prior to opening of the inlet valve, and in response to opening of the inlet valve, continuing to inject fuel via the port injector and initiating injection of fuel via the hollow cone injector.

7. The engine system of claim 6, wherein the fuel injected via the hollow cone injector enters the combustion chamber through an annular gap created between the open inlet valve and an outlet of the inlet duct coupled to the combustion chamber.

8. The engine system of claim 6, wherein the controller is further configured to increase a duration of inlet valve opening in response to the target amount of fuel being greater than the threshold.

9. The engine system of claim 8, wherein the controller is further configured to increase a duration of fuel injection via the hollow cone injector in response to the target amount of fuel being greater than the threshold.

10. The engine system of claim 6, further comprising a direct injector coupled to the combustion chamber, wherein injecting the second amount of fuel further includes directly injecting fuel into the combustion chamber via the direct injector in response to closing of the inlet valve.

11. An engine system comprising:
a combustion chamber;
an inlet duct associated with the combustion chamber;
an inlet valve;
a first injector coupled to the inlet duct upstream of the inlet valve, wherein fuel is discharged from the first injector as an annular jet having a geometry of a hollow cone;
a second injector coupled to the inlet duct upstream of the first injector;
a third injector coupled directly to the combustion chamber; and
a controller configured with computer readable instructions stored on non-transitory memory for:
monitoring an engine load;
determining an amount of fuel to be injected for each injector in response to a change in the engine load and a status of the inlet valve, including,
when the engine load is not greater than a threshold and the inlet valve is open, injecting fuel with the first injector and not injecting fuel with the second and third injectors;
when the engine load is greater than the threshold, initiating injection of fuel with the second injector prior to the inlet valve opening, continuing to inject fuel with the second injector and initiating injection of fuel with the first injector in response to the inlet valve opening, stopping injection of fuel with the second injector prior to the inlet valve closing while continuing to inject fuel with the first injector, and in response to the inlet valve closing, stopping injection of fuel with the first injector in response and initiating injection of fuel with the third injector.

12. The method of claim 2, wherein during the fuel injection, the inlet valve is arranged within a hollow void formed by the hollow cone geometry of the injected fuel, and wherein the injected fuel is directed solely into the annular gap.

* * * * *